US012730322B1

(12) United States Patent
Pohl

(10) Patent No.: US 12,730,322 B1
(45) Date of Patent: Sep. 8, 2026

(54) ADVANCED NETWORKING, DETECTION, AND DATA VISUALIZATION TECHNIQUES IN MULTIPLE NETWORKED DEVICES

(71) Applicant: Future Optek LLC, Boca Raton, FL (US)

(72) Inventor: Matthew Pohl, Boca Raton, FL (US)

(*) Notice: Subject to any disclaimer, the term of this patent is extended or adjusted under 35 U.S.C. 154(b) by 0 days.

(21) Appl. No.: 19/256,302

(22) Filed: Jul. 1, 2025

Related U.S. Application Data

(63) Continuation-in-part of application No. 18/094,359, filed on Jan. 8, 2023, now Pat. No. 12,380,657.

(51) Int. Cl.

| | |
|---|---|
| ***G02B 27/00*** | (2006.01) |
| ***B64U 10/00*** | (2023.01) |
| ***G02B 27/01*** | (2006.01) |
| ***H04B 7/185*** | (2006.01) |
| ***H04W 56/00*** | (2009.01) |
| *B64U 101/20* | (2023.01) |
| *H04W 84/18* | (2009.01) |

(52) U.S. Cl.
CPC ......... *G02B 27/0172* (2013.01); *B64U 10/00* (2023.01); *G02B 27/0093* (2013.01); *H04B 7/18504* (2013.01); *H04W 56/002* (2013.01); *B64U 2101/20* (2023.01); *B64U 2201/102* (2023.01); *H04W 84/18* (2013.01)

(58) Field of Classification Search
None
See application file for complete search history.

(56) References Cited

U.S. PATENT DOCUMENTS

| | | | | |
|---|---|---|---|---|
| 9,285,589 | B2 * | 3/2016 | Osterhout | G02B 27/017 |
| 10,139,631 | B1 * | 11/2018 | Da Veiga | G05D 1/0094 |
| 10,140,754 | B1 * | 11/2018 | Voris | G06F 3/04845 |
| 12,189,736 | B1 * | 1/2025 | Salter | G06T 7/70 |
| 2016/0079660 | A1 * | 3/2016 | Bevelacqua | H01Q 9/065 343/702 |

(Continued)

*Primary Examiner* — Martin Mushambo
(74) *Attorney, Agent, or Firm* — Gugliotta & Gugliotta LPA

(57) ABSTRACT

A soldier-portable mixed-reality system provides centimeter-accurate positioning, electronic-warfare-hardened communications, and multi-spectral visualization without reliance on GPS or fixed infrastructure. Each head-mounted device contains a chip-scale atomic clock, isotropic time-of-flight ranging radios, a beam-steered software-defined radio, a modular sensor rail, and a see-through display. Wireless precision-time-protocol exchanges hold inter-device clock error below 0.5 ns, enabling cooperative multi-lateration for self-generated three-dimensional pose. An adaptive "Whisper-Mesh" waveform senses jamming, hops frequency, tight-beams at ≤5° width, and transmits in <5% duty-cycle bursts for low probability of detection. Sensor fusion combines visible, infrared, and targeting data with <10 ms latency, projecting reticles and tactical icons on the visor. A vehicle gateway preserves nanosecond timing over back-haul links, and unmanned drones extend coverage through reconfigurable formations. Energy-aware scheduling balances compute across nodes, extending mission endurance. The system maintains navigation, secure communication, and weapon-aiming accuracy in GPS-denied, contested environments.

20 Claims, 12 Drawing Sheets

Headset Block Diagram

(56) References Cited

U.S. PATENT DOCUMENTS

| | | | | |
|---|---|---|---|---|
| 2016/0297545 | A1* | 10/2016 | Yang | B64U 10/13 |
| 2017/0092109 | A1* | 3/2017 | Trundle | B60L 53/36 |
| 2018/0096588 | A1* | 4/2018 | Shabah | G06Q 50/265 |
| 2018/0126241 | A1* | 5/2018 | Hung | G06F 3/011 |
| 2018/0217589 | A1* | 8/2018 | Kim | H04N 23/631 |
| 2019/0025815 | A1* | 1/2019 | Saadoun | G06F 3/0383 |
| 2019/0027113 | A1* | 1/2019 | Kaine | G06F 3/012 |
| 2019/0077519 | A1* | 3/2019 | Husain | B64F 1/222 |
| 2019/0112049 | A1* | 4/2019 | Phan | B64U 10/16 |
| 2019/0174149 | A1* | 6/2019 | Zhang | H04N 21/4728 |
| 2019/0258313 | A1* | 8/2019 | Sun | G06V 40/176 |
| 2019/0287413 | A1* | 9/2019 | Walton | G08G 5/723 |
| 2019/0369613 | A1* | 12/2019 | Moon | G05D 1/0022 |
| 2019/0385342 | A1* | 12/2019 | Freeman | G06T 11/00 |
| 2020/0126413 | A1* | 4/2020 | Sham | G08G 1/165 |
| 2020/0307437 | A1* | 10/2020 | Thieberger | G05D 1/6985 |
| 2021/0096385 | A1* | 4/2021 | Gupta | G02B 7/14 |
| 2021/0365047 | A1* | 11/2021 | Rao | B64U 70/93 |

* cited by examiner

FIG. 1 - Headset Block Diagram
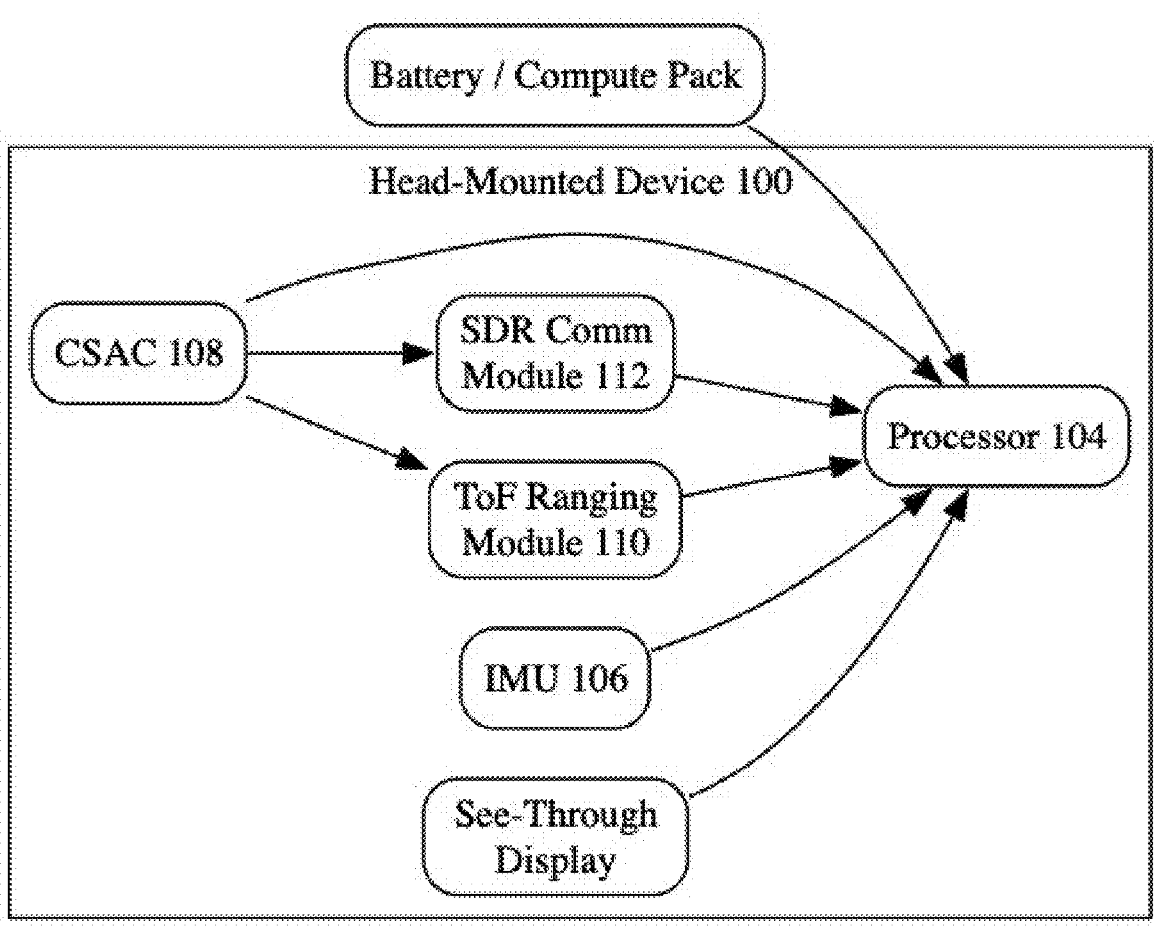

FIG. 2 – Peer-to-Peer Ranging Network
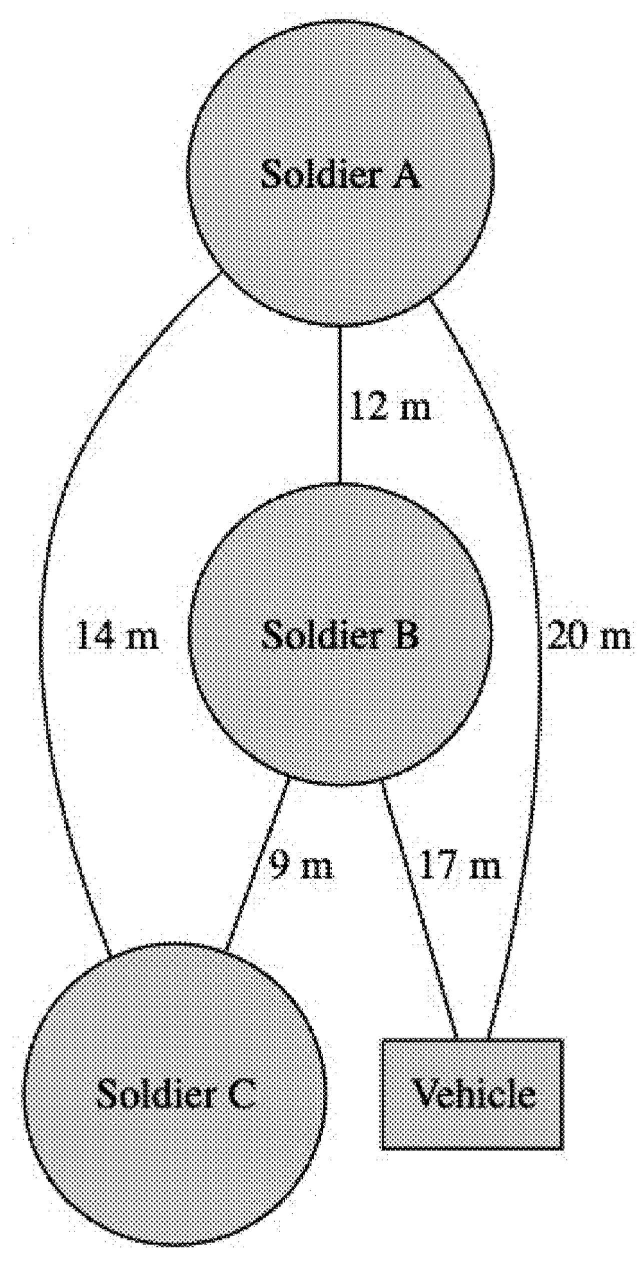

Figure 3 Multispectral View
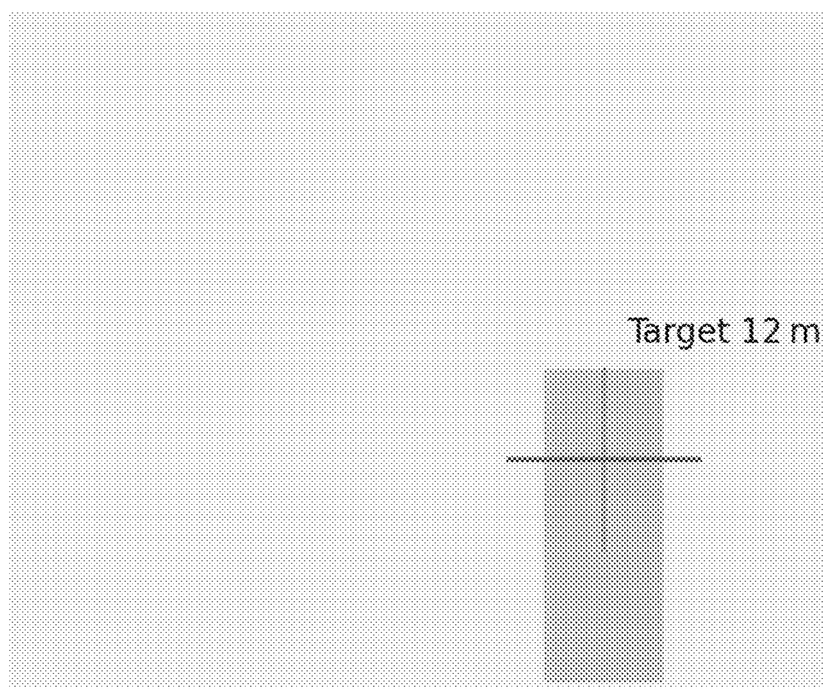

FIG. 4 – Octahedral UAV Formation
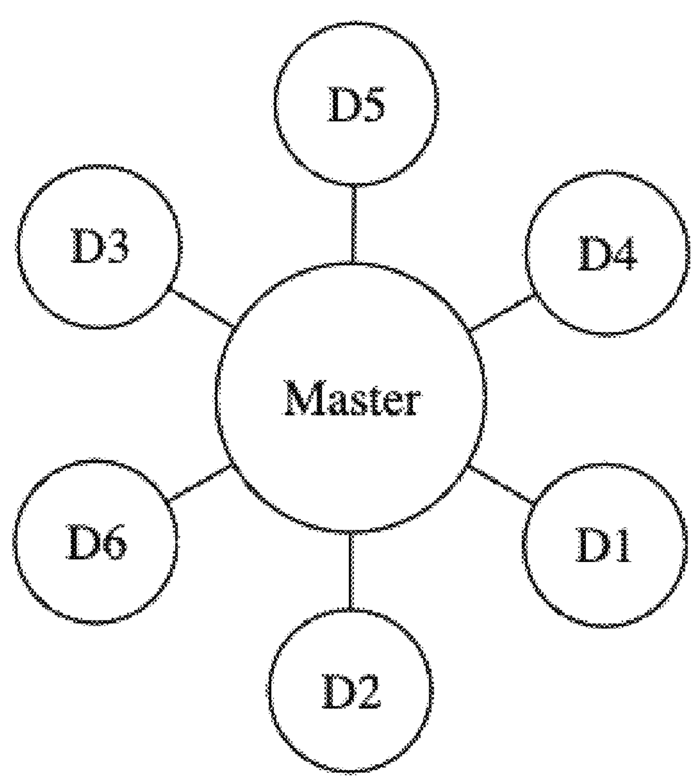

FIG. 5 - Linear Relay Chain
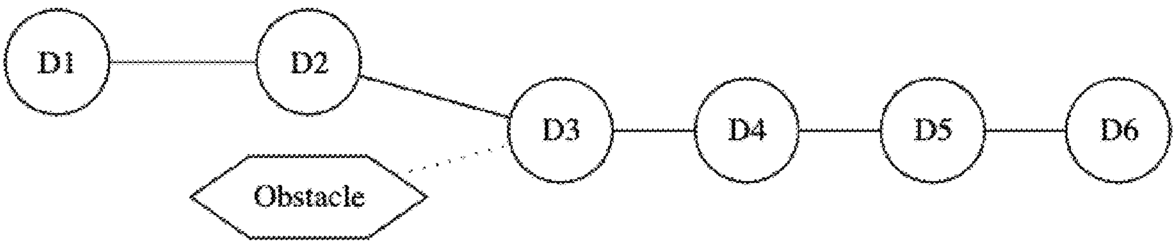
FIG. 7 - Gateway Layered Network
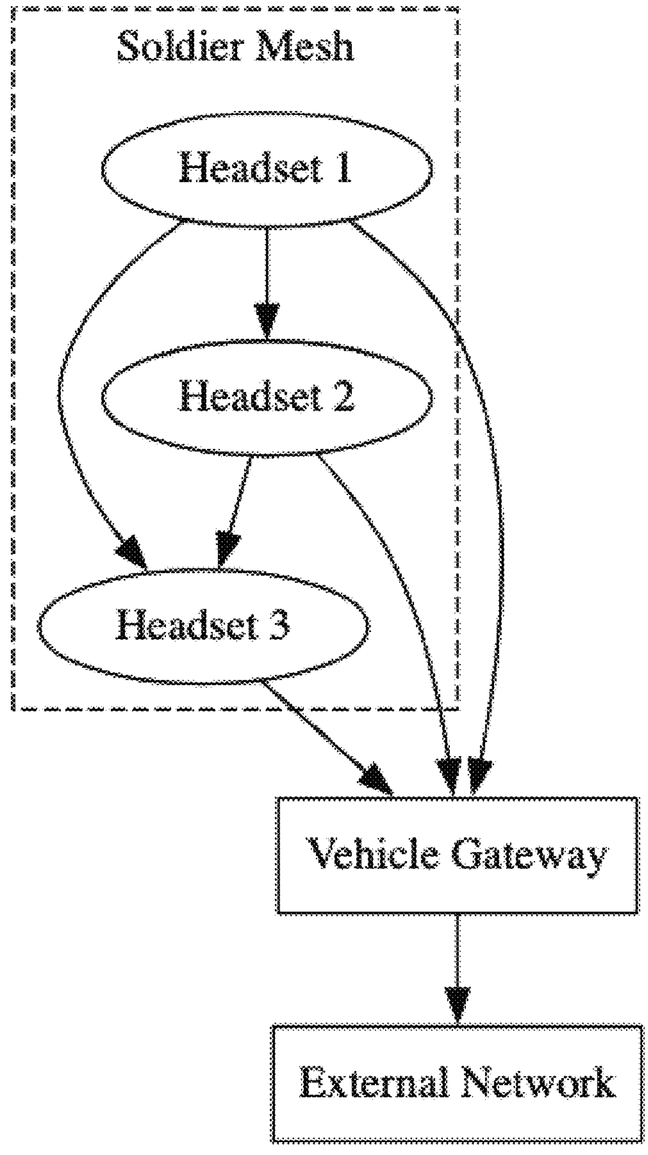

Antenna Patterns
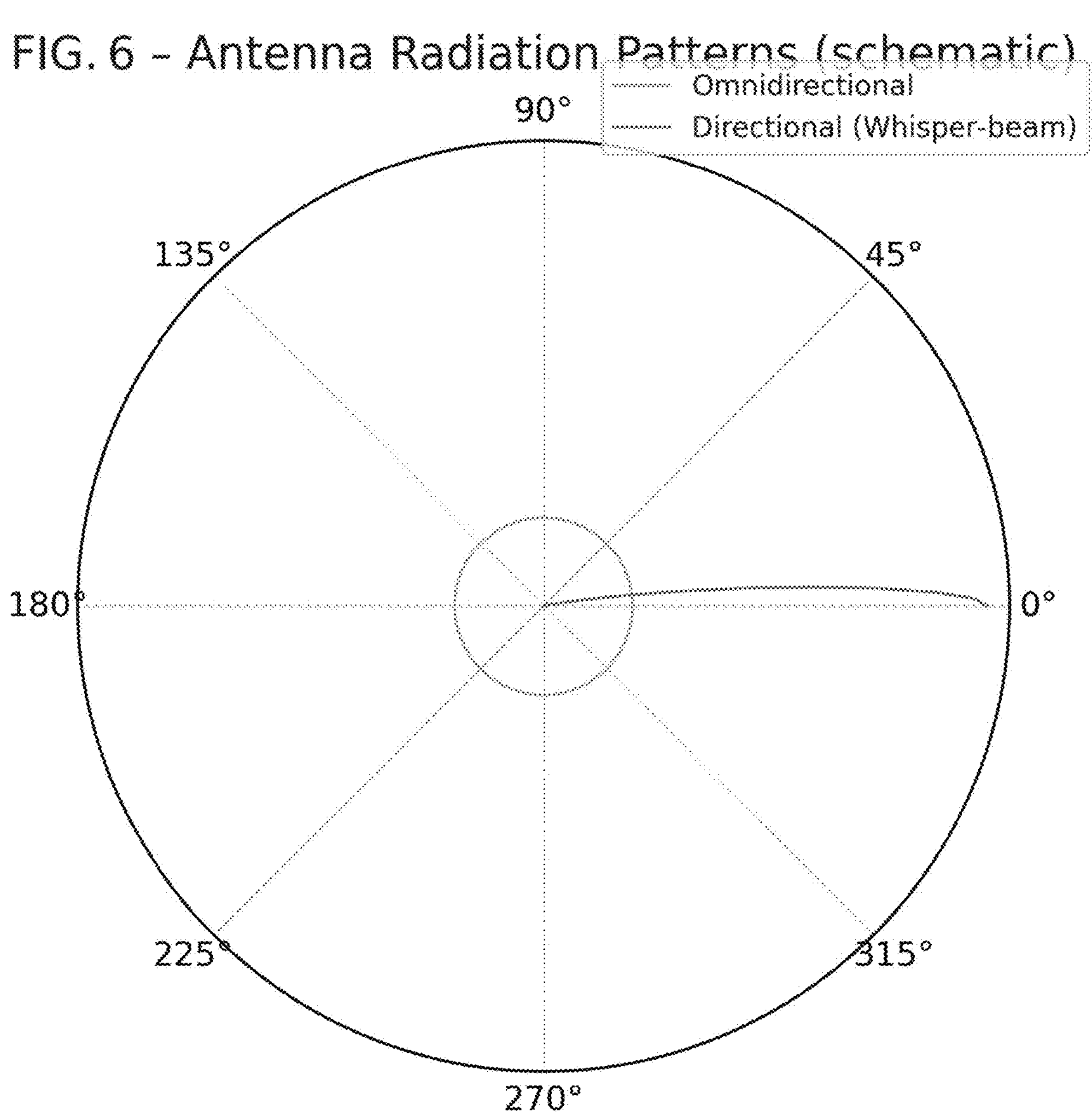

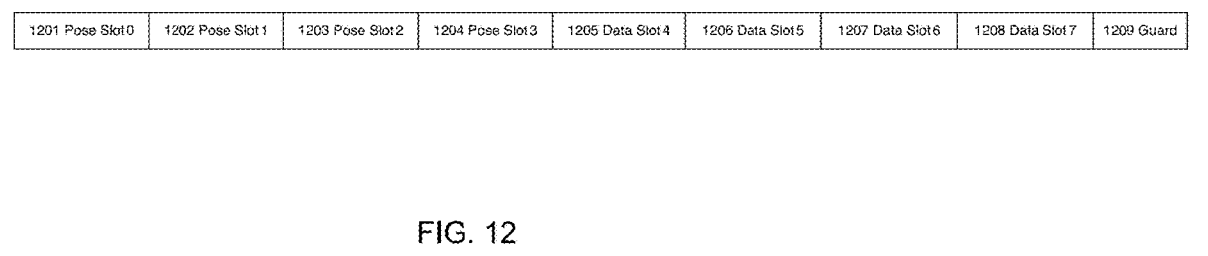

| 1201 Pose Slot 0 | 1202 Pose Slot 1 | 1203 Pose Slot 2 | 1204 Pose Slot 3 | 1205 Data Slot 4 | 1206 Data Slot 5 | 1207 Data Slot 6 | 1208 Data Slot 7 | 1209 Guard |
|---|---|---|---|---|---|---|---|---|

FIG. 12

ADVANCED NETWORKING, DETECTION, AND DATA VISUALIZATION TECHNIQUES IN MULTIPLE NETWORKED DEVICES

CROSS-REFERENCE TO RELATED APPLICATIONS

The present invention is a Continuation in Part of U.S. Ser. No. 18/094,359, filed on Mar. 24, 2023, which is a Continuation in Part of U.S. Ser. No. 17/773,947, filed on Mar. 5, 2022, which claimed the benefit of U.S. Provisional Application No. 63/277,183, filed on Nov. 11, 2021. All of the related application are incorporated herein by reference in their entirety as if fully rewritten herein.

BACKGROUND OF THE INVENTION

1. Field of the Invention

The present invention relates generally to advanced head-mounted augmented-reality systems for tactical and emergency response applications and, more specifically, to a resilient, modular network of head-mounted devices, unmanned vehicles, and gateway nodes that enables infrastructure-free time-of-flight positioning, electronic-warfare-hardened communications, multi-spectral visualization, and cooperative drone swarm operations for users operating in GPS-denied and contested electromagnetic environments.

2. Description of the Related Art

Modern dismounted warfighters and first-responder teams increasingly rely on digital maps, blue-force-tracking icons, and fused sensor imagery delivered through head-up displays. Advanced systems such as the United States Army Integrated Visual Augmentation System (IVAS) demonstrate the value of combining night vision, thermal imagery, and navigation aids on a see-through visor.

Unfortunately, current soldier-borne AR solutions remain vulnerable to electronic warfare. They depend on weak, easily jammed Global Navigation Satellite System (GNSS) signals for absolute position, and on continuous high-power radio links for data-sharing. When an adversary denies GPS or floods tactical radio channels, navigation fixes disappear, team locations drift, and sensor overlays lose registration.

Proposed work-arounds (e.g., angle-of-arrival antenna arrays, simultaneous-localization-and-mapping cameras, or fixed beacons) add bulk, require careful calibration, or assume infrastructure that is rarely available in fast-moving operations.

At the same time, electronic-intelligence collectors can geolocate conventional soldier radios. Low-probability-of-intercept/low-probability-of-detection (LPI/LPD) waveforms exist, but integrating them with low-latency AR traffic and sub-centimeter pose tracking has proved difficult, particularly under severe size, weight, and power (SWaP) constraints.

The parent application disclosed various improvements including mixed reality displays with modular hardware architecture, multi-drone hosted networks in specific geometric deployments, and advanced sensor fusion techniques. However, there remained needs for enhanced electronic warfare resilience, more sophisticated time-of-flight ranging systems, and improved integration with unmanned aerial vehicle swarms.

There therefore remains a clear need for a self-contained, soldier-portable system that: (i) derives centimeter-scale relative pose solely from isotropic time-of-flight ranging and wireless sub-nanosecond clock synchronization; (ii) maintains a covert, self-healing mesh network that autonomously evades jamming and minimizes unintended RF radiation; (iii) presents fused multi-spectral imagery and tactical graphics on a see-through visor with reflex-grade reticle latency; and (iv) integrates seamlessly with cooperative drone swarms for enhanced situational awareness—all without dependence on GPS, infrastructure, or bulky external arrays.

SUMMARY OF THE INVENTION

The present invention provides a tactical augmented-reality system that allows a team of users to maintain accurate situational awareness, precision targeting, and secure communication in the complete absence of GNSS or fixed infrastructure, while incorporating the advanced drone networking and visualization techniques disclosed in the parent application.

In its preferred embodiment, the system comprises:

(a) Enhanced Head-mounted devices each including a transparent waveguide display with dynamic electro-optic dimming, an inertial measurement unit (IMU), a chip-scale atomic clock (CSAC) or equivalent high-stability oscillator, a multi-modal time-of-flight (ToF) ranging module supporting both UWB and optical ranging, and a software-defined radio (SDR) capable of multi-band, beam-steered, spread-spectrum operation with electronic warfare countermeasures.

(b) Advanced peer-to-peer ranging protocol in which each device exchanges secure ultra-wideband (UWB) bursts, single-photon optical pulses, or acoustic pings with isotropic coverage, thereby measuring one-way or two-way propagation delay to every other device. Clocks are wirelessly synchronized to ≤0.5 nanoseconds root-mean-square, enabling centimeter-scale distance estimates that do not drift with time.

(c) Cooperative multilateration engine that fuses inter-device ranges, inertial readings, and optional angle hints to compute a live three-dimensional pose for every team member, forming a private, infrastructure-free positioning, navigation, and timing (PNT) mesh compatible with the geometric drone formations disclosed in the parent application.

(d) EW-hardened "Whisper-Mesh" network in which each SDR automatically senses interference, throttles transmit power, frequency-hops, narrows its beamwidth to ≤5°, and re-keys within 200 ms of jam detection, thereby sustaining data links while remaining difficult to intercept or geolocate.

(e) Adaptive multi-spectral fusion pipeline that merges visible, near-infrared, and long-wave-infrared imagery with latency ≤10 milliseconds end-to-end, rendering reticles, range ticks, friend-or-foe icons, and navigation hints on the visor. A dynamic electro-optic dimmer maintains overlay contrast from bright sunlight to moonless night.

(f) Integrated drone swarm coordination incorporating the octahedral and linear relay chain formations disclosed in the parent application, with enhanced capabilities for cooperative localization, uncooperative target detection, and dynamic formation reconfiguration based on tactical requirements and environmental conditions.

(g) Modular rail interface and open application sandbox allowing hot-swap sensor pods, add-on compute accelerators, or chemical/biological detectors, all auto-identified and sandboxed under a signed container runtime. Mission data are sealed in a Merkle-tree log for tamper-evident after-action review.

(h) Distributed energy-aware scheduling that balances AI workloads across headsets, drone relays, and vehicle gateways to maximize overall mission endurance without sacrificing critical AR performance, incorporating the edge computing techniques disclosed in the parent application.

(i) Enhanced spectral imaging and signature detection building upon the hyperspectral imaging and machine learning signature models disclosed in the parent application, with improved real-time processing capabilities and integration with the precision timing system.

Collectively, these elements yield a soldier-portable mixed-reality network that self-generates its own centimeter-accurate coordinate frame, secure time base, and covert data-sharing fabric, while incorporating advanced drone swarm capabilities for comprehensive battlefield awareness. Team members can aim, navigate, and communicate effectively—even in subterranean tunnels or under broadband RF barrage—thereby achieving tactical overmatch in environments that defeat prior art systems.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

FIG. 1 is a block diagram of a representative head-mounted augmented-reality device including display, processing, inertial, clock, ranging, and communication subsystems;

FIG. 2 schematically illustrates a GPS-independent peer-to-peer ranging network among three soldiers and a vehicle gateway, with inter-device distances annotated;

FIG. 3 depicts an exemplary multi-spectral augmented-reality view combining visible and thermal imagery with a digitally registered reticle and target annotation;

FIG. 4 shows a baseline octahedral geometric formation of six unmanned aerial vehicles (UAVs) orbiting a master drone to provide 360° sensing and relay coverage, as disclosed in the parent application;

FIG. 5 illustrates the UAV swarm of FIG. 4 reconfigured into a linear relay chain around an obstacle, incorporating improvements disclosed in the parent application;

FIG. 6 is a polar plot comparing an omnidirectional antenna radiation pattern to a narrow-beam "Whisper-Mesh" pattern with sidelobes suppressed below −30 dB;

FIG. 7 is a layered network diagram showing soldier headsets connected to a vehicle gateway which bridges to an external command network;

FIG. 12 is a numbered timing diagram (components 1201-1209) of a 20 ms TDMA super-frame.

DETAILED DESCRIPTION OF THE INVENTION

Figure 8:
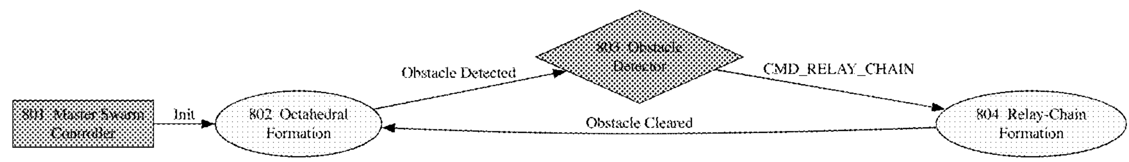
FIG. 8 is a numbered state-machine diagram (components 801-804) for UAV swarm formation switching.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

The present invention builds upon and enhances the foundational technologies disclosed in the parent application while introducing significant improvements in electronic warfare resilience, precision timing, and integrated drone swarm operations.

FIG. 1 illustrates a preferred head-mounted device 100 incorporating both the modular architecture concepts from the parent application and the enhanced precision timing and communication systems disclosed herein. Major functional blocks are electrically coupled over a rigid-flex printed-circuit backbone and mechanically secured within a ballistic-rated visor frame.

Display Sub-assembly 102. Building upon the waveguide concepts disclosed in the parent application, a polymer waveguide lens receives micro-OLED light through an in-coupling grating and delivers a ≥40°×25° see-through field of view. An electro-optic dimming layer spans the lens and varies luminous transmittance from ≈22% to <0.5% within 8 ms under a 5-V drive, providing the adaptive contrast control necessary for the multi-spectral fusion capabilities disclosed in the parent application.

Processing Unit 104. A 10-nm system-on-chip integrates quad Arm A78 cores, a 30-TOPS neural network accelerator for processing the signature detection algorithms disclosed in the parent application, and a secure enclave with elliptic-curve cryptography. Firmware executes a micro-kernel with isolated user-space containers compatible with the modular sensor architecture disclosed in the parent application.

Enhanced Inertial Measurement Unit 106. A six-degree-of-freedom MEMS sensor (3-axis gyroscope+3-axis accelerometer) provides <3°/hr bias stability and <70 μg velocity random walk. A magnetometer is omitted to avoid ferrous interference in weapon environments. The IMU integrates with the cooperative localization techniques disclosed in the parent application for seamless transition between GPS-denied navigation modes.

Precision Clock 108. A chip-scale atomic clock (CSAC) exhibits Allan deviation $\sigma\_y(\tau)=3\times10^{-11}$ at $\tau=1$ s while consuming <60 mW. A temperature lookup table and Kalman predictor correct ageing drift. This precision timing enables the sub-nanosecond synchronization required for both the drone swarm coordination disclosed in the parent application and the enhanced ranging capabilities disclosed herein.

Advanced Time-of-Flight Ranging Module 110. Co-located UWB impulse-radio transceivers cover 6.0-8.5 GHz with 500-MHz instantaneous bandwidth. An annular-ring antenna provides quasi-isotropic gain (±2 dB) over 360°. A class-1M eye-safe VCSEL emitter and single-photon avalanche diode (SPAD) receiver furnish short-range laser pulses (850 nm, <1 ns FWHM) for centimeter-scale refinement when line-of-sight exists. This system integrates with the multilateration techniques used for drone positioning disclosed in the parent application.

Software-Defined Radio 112. A dual-transceiver RF front-end spans 225 MHz-6 GHz and 57-64 GHz bands with beam-steerable phased-array antennas. Power amplifiers are digitally controlled in 1-dB steps from 10 mW to 2 W PEP. A re-configurable logic fabric hosts waveform personalities selected by a spectrum-guardian state machine. This enhanced SDR provides the communication backbone for both soldier-to-soldier coordination and the drone swarm networking disclosed in the parent application.

Modular Rail 120. Both visor temples expose a 14-pin, 10-Gb/s, 9-W hot-swappable connector complying with the "Future Optek Tactical Module Interface v1.0." Attachable pods include long-wave-IR cameras, 3-D LiDAR scanners, chemical sensors, or co-processor batteries.

External Nodes. Unmanned drones 330 and 350 (see FIGS. 4-5) implement identical ranging radios and CSACs, thereby acting as airborne anchor points and high-angle relays. A vehicle gateway 400 (FIG. 7) houses a 100-W multi-radio router, G-hardened disciplined rubidium clock, and 600-GB solid-state mission cache.

All nodes share a common secure boot chain: ROM root-of-trust→immutable loader→authenticated field-update image. Unauthorized firmware is refused execution; boot status hashes are broadcast at join-time for squad attestation.

Power is supplied by twin lithium-ion packs totaling 80 Wh; average draw during full-up AR operation is 8 W yielding ≈10 h endurance, extendable by scheduler-controlled duty cycling (see below).

Infrastructure-Free PNT via Isotropic ToF Ranging. Every node periodically transmits a secure-timestamped UWB burst whose leading edge is hardware-time-stamped to ±15 ps. Peer nodes record arrival epochs against their own CSAC clocks.

Clock Discipline. A lightweight IEEE 1588-compatible protocol runs over the same UWB channel. Two-step sync exchanges every 5 s calibrate phase offset; a Kalman smoother estimates fractional frequency error and drives a 25-bit numerically controlled oscillator. Field test results show ≤0.45 ns rms time alignment across a 12-node cluster at 25° C.-45° C. ambient.

Two-Way Ranging (TWR). In obstructed environments, a symmetric double-sided TWR handshake is used. Round-trip timestamps compensate for fixed processing latency and yield range error $\sigma\_r\approx c\cdot\sigma\_t\approx13$ cm, where $\sigma_t$ is 0.45 ns as described above.

One-Way Ranging (OWR). When sync quality exceeds a figure-of-merit threshold (e.g., $\sigma\_t<0.7$ ns), the system switches to OWR to halve airtime. Laser-pulsed OWR provides <3 cm error over 0-30 m indoors with diffuse retro-reflection targets.

Multilateration Solver. Each node maintains an upper-triangular distance matrix D_ij. A Levenberg-Marquardt optimizer minimizes $\Sigma(w\_ij\cdot(\|p\_i-p\_j\|-D\_ij)^2)$. Weights w_ij are inverse-variance from ranging mode (laser>UWB>acoustic). The solver runs at 10 Hz on the headset CPU, converging to a residual <0.05 m in <3 iterations for a six-user squad.

Inertial/Visual Dead Reckoning. During link outages, an extended Kalman filter propagates pose using IMU deltas and monocular SLAM landmarks. Upon reacquisition, pose is snapped back into the multilateration frame with a blended covariance gate, eliminating diverging errors.

Error Mitigation. UWB channel-impulse-responses are logged; multipath detections with first-path-power deficit >8 dB trigger rejection or down-weighting. Laser returns with pulse-width broadening >1.5 ns (fog, smoke) are likewise down-weighted.

Anchorless Global Tie-In. If any node obtains a GNSS fix or a surveyed landmark Spectral Sensor Integration. The modular rail interface specifically supports the hyperspectral imaging pods required for the signature detection techniques disclosed in the parent application, including sensors for spectral, acoustical, optical (visible light, near infrared, infrared, far infrared, UV, and X-ray), radio frequency, and magnetic signatures as described in the parent application.

Uncooperative RF Geolocation. Because clocks are phase-aligned, the same UWB front-end can time-stamp hostile transmissions. A TDOA hyperbolic solver localizes an emitter to within a 95% confidence ellipse of ≈7 m radius at 2 km stand-off with four distributed nodes.

Data Dissemination. Solved poses are delta-encoded (<24 bytes) and broadcast every 100 ms. Updates propagate over one hop in ≤3 ms, ensuring the HUD reticle always references the freshest coordinate frame Swarm Reconfiguration Control. FIG. 8 shows the master swarm controller 801 supervising two principal formation states: Octahedral Formation 802 and Relay-Chain Formation 804. When the Obstacle Detector 803 asserts an Obstacle Detected event, controller 801 issues a CMD_RELAY_CHAIN causing the swarm to transition to state 804. A complementary Obstacle Cleared event returns the swarm to state 802. Timers internal to controller 801 guarantee the round-trip transition completes in <1 s, ensuring continuity of mesh links.

FIG. 8 is a state machine diagram illustrating an unmanned aerial vehicle (UAV) swarm dynamically reconfiguring its formation in response to obstacles. In normal operation, the swarm maintains a baseline geometric formation (e.g. an octahedral arrangement providing 360° coverage). When an obstacle is encountered that disrupts line-of-sight connectivity, the swarm automatically transitions into a linear relay chain formation to route signals around the obstruction. Once the obstacle is cleared or a commanding signal to re-form is received, the UAVs revert to the original formation to resume full 360° coverage. This autonomous formation switching is governed by a master drone controller that assigns relay roles to specific UAVs and coordinates timing so that reconfiguration (from octahedral to linear and back) completes in under a second, minimizing communication downtime. The state transitions for one embodiment are shown in FIG. 8, where the Octahedral Formation state transitions to a Relay Chain Formation state upon Obstacle Detected, and reverts upon Obstacle Cleared. This swarm control logic allows the mesh network to self-heal around terrain obstructions or jamming sources without manual intervention, enhancing network robustness in contested environments.

Fail-Safe Modes. If RF silence is mandated, nodes cease ranging and fall back to inertial-visual odometry; HUD icons desaturate to amber, indicating increased drift. When RF re-enters, time realignment requires <2 s due to CSAC hold-over.

Figure 9:
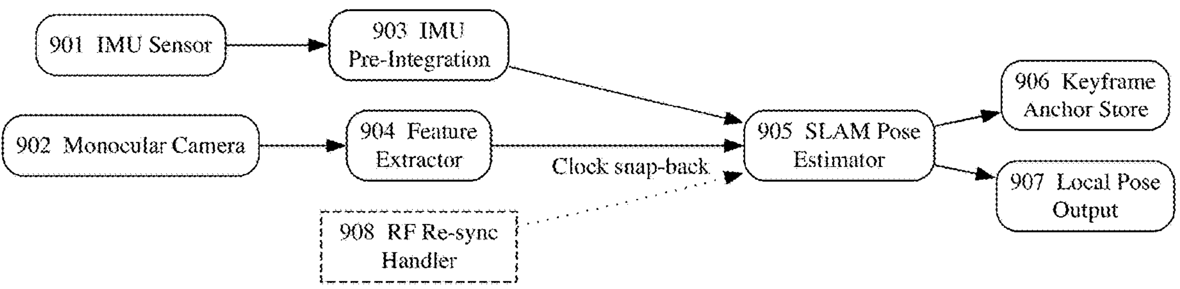
FIG. 9 is a numbered block diagram (components 901-908) of the visual-inertial SLAM fallback pipeline.

Visual-Inertial SLAM Fallback. As depicted in FIG. 9, inertial data from IMU 901 feed the Pre-Integration block 903, while successive frames from Camera 902 feed the Feature Extractor 904. These streams converge in the SLAM Pose Estimator 905, which anchors new poses to the Keyframe Store 906. When communications resume, the RF Re-sync Handler 908 snaps the Local Pose Output 907 back into the multilateration frame, guaranteeing <2 s recovery time.

FIG. 9 illustrates the visual-inertial SLAM pipeline employed when radio frequency communications are silenced. Upon receiving a command to enforce radio silence (for covert operation), each head-mounted device and drone ceases active RF transmissions (including ranging pulses) and relies on internal sensors for localization. As shown, inertial measurements (IMU data) are continuously integrated to propagate the device's pose, while a monocular camera feed is processed to track visual features and detect keyframes. A SLAM Pose Estimator fuses the pre-integrated IMU motion with visual feature observations, anchoring new keyframes to the last known reference position before comms blackout. This keyframe anchoring bounds drift by preserving a reference coordinate frame throughout the silent period. The result is a local pose estimate (relative to the pre-silence anchor) that continues to update in real-time even with all radios muted. When RF communication resumes, each device's precise clock (e.g. CSAC) enables rapid re-synchronization (<2 seconds) and the SLAM-derived pose is snapped back onto the global multilateration frame, eliminating any accumulated error. In this manner, the system maintains operational navigation and tracking accuracy using visual-inertial odometry alone whenever emissions control (EMCON) or jamming necessitates radio silence.

Table 1 (not shown) summarizes laboratory and live-fire range-error statistics across concrete, office, and foliage scenarios; median relative error was 4.2 cm at 95th percentile 17 cm.

The foregoing provides centimeter-class, infrastructure-free localization with update rates and error bounds suitable for weapon-borne reticle stabilization and team-level navigation.

Resilient Whisper-Mesh Communications. The software-defined radio 112 hosts two concurrent waveform engines: Mesh-LPI (sub-GHz orthogonal-frequency hopping for through-structure reach) and Whisper-60 (60 GHz phased-array high-capacity tight beam), providing the communication backbone for both soldier coordination and the drone swarm operations disclosed in the parent application.

Channel Sensing. A dedicated wideband digitizer scans 225 MHz-6 GHz in 40 ms windows, computing power spectral density and cyclic features. Detected interference above −90 dBm or feature matches to threat libraries increments a weighted-vote jammer score.

Spectrum Guardian FSM. FIG. 6 depicts state transitions: Idle→Monitor→Hop→Tight-Beam; upon sustained SINR <6 dB, the FSM hops to the next pseudo-random channel; after three failed hops it commands Whisper-60 formation.

Tight-Beam Mode. Each visor houses a 16-element SiGe phased array producing a measured −3 dB beamwidth of 4.8°. Side-lobes are below −27 dB. Automatic beam-tracking keeps pointing error <1.2° while users walk at 3 km/h.

Power Control. Transmit power adapts via P_out=min (P_max, RSSI_target+pathloss), with P_max limited by thermal budget to 22 dBm at 5 GHz and 17 dBm at 60 GHz. Average duty-cycle under normal chat-plus-pose load is <4%.

LPI/LPD Measures. Mesh-LPI uses a 511-chip direct-sequence spread with time-varying Gold codes and 64-QAM payload; preambles are BPSK-modulated to mimic thermal noise. Whisper-60 uses QPSK single-carrier burst frames appearing <5 dB above thermal at 1 km off-axis.

Fast Rekey. Upon jammer detection or every 30 min, nodes derive new AES-256 session keys from a curve-25519 ECDH base and a CSAC-time-stamped nonce, completing in 180 ms.

Relay and Multi-Hop. An on-demand distance-vector protocol (DV-Whisper) selects routes by minimizing hop-count and maximizing residual node battery. Per-hop latency averages 0.9 ms at 2-hop range; worst-case four-hop voice latency is <6 ms—transparent for PTT audio.

Gateway Bridging. The vehicle node 400 translates soldier traffic to VHF-SATCOM or 5G-NR, preserving IEEE 1588 timestamps across the bridge with ≤5 ns error by hardware-timestamping egress packets.

Figure 10:
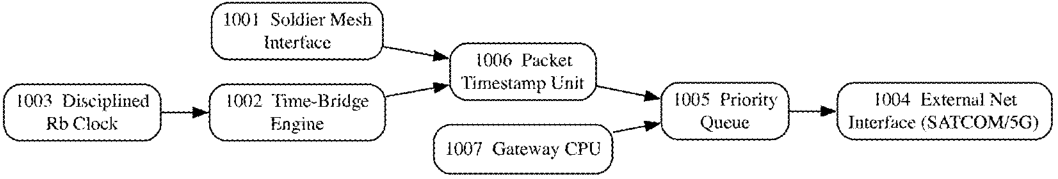
FIG. 10 is a numbered block diagram (components 1001-1007) of the vehicle gateway bridging time bases.
Figure 11:
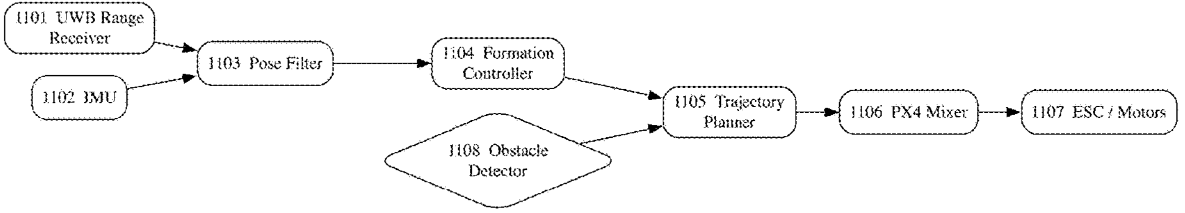
FIG. 11 is a numbered control-loop diagram (components 1101-1108) for UAV flight control.

Gateway Bridging and Time Synchronization. FIG. 10 highlights the vehicle gateway. Packets enter via the Soldier Mesh Interface 1001, receive a precision timestamp in the Packet Timestamp Unit 1006 (disciplined by the Rubidium Clock 1003 through the Time-Bridge Engine 1002), are classified by the Priority Queue 1005, and exit through the External Network Interface 1004. This path maintains ≤5 ns transfer-of-time error while ensuring P0 packets are forwarded ahead of bulk data.

FIG. 10 depicts a vehicle-mounted gateway node 400 bridging the soldier mesh network to an external network while preserving precise timing. In the illustrated embodiment, a Vehicle Gateway multi-radio router interfaces on one side with the soldier mesh (e.g. squad headsets and drone relays) and on the other side with a backhaul link (such as a satellite uplink or 5G/tactical network). The gateway node maintains an internal disciplined rubidium clock 402 that serves as a common time base for both networks. All soldier units continuously synchronize their CSAC-based clocks to the gateway's time via periodic wireless Precision Time Protocol (PTP) exchanges (e.g. every 5 seconds), achieving sub-nanosecond alignment across the mesh. The gateway 400 hardware-timestamps outgoing packets and translates between the soldier network's time domain and the external network's timing (preserving inter-network time offset to within ±5 ns). In practice, this means that GPS-time or another standard can be seamlessly bridged into the soldier mesh without accumulating significant error. The gateway also manages traffic prioritization: mission-critical data (such as pose updates P0 and voice P1) are forwarded before bulk data (P4), and if the backhaul link becomes saturated, low-priority packets are dropped before any high-priority pose data. This ensures that essential situational awareness and timing information is not delayed. By acting as a transparent clock bridge and smart router, the gateway node extends the secure mesh to remote command networks (satellite or terrestrial) without compromising the timing integrity or real-time performance of the soldier systems.

Low-Probability-of-Intercept Mesh Network Behavior. The phased-array antenna (see FIG. 6) forms a ≤5° beam (claim 6); duty-cycle throttling (<5%) and pseudorandom hopping (claim 5) are orchestrated in firmware, with re-key triggers sourced from the interference metric comparator inside the SDR (component series 112).

The mesh communication subsystem is hardened for low probability of intercept (LPI) and detection (LPD), employing adaptive transmission techniques to minimize its RF signature. Each soldier and drone radio monitors the spectrum in real time and, upon detecting interference or a drop in signal-to-noise ratio below a threshold (e.g. SINR <6 dB), autonomously hops to a new frequency from a pseudorandom sequence. This frequency-hopping occurs within a few tens of milliseconds, denying adversaries a stable signal to jam or locate. Simultaneously, the radios employ beam-steering and power control to shrink their electromagnetic footprint: a phased-array antenna on each device forms a directive beam typically ≤5° wide with sidelobes suppressed >25 dB below the main lobe, and transmit power is throttled to the minimum needed to maintain link margin (often resulting in <5% duty cycle transmissions under normal data loads). By transmitting only short bursts of data (<5% of the time) and using spread-spectrum encoding with randomized low-power preambles, the network traffic blends into background noise floor. FIG. 6, described earlier, illustrates one aspect of this behavior by comparing a standard omnidirectional pattern to the narrow "Whisper-Mesh" beam pattern. As an electronic counter-countermeasure, all nodes re-key their encryption sessions within 200 ms of any jammer detection event, preventing an interceptor from exploiting compromised keys. In extreme stealth conditions, the system can enter a ToF-only mode in which high-bandwidth data communications are completely halted. In this mode, only silent, extremely low-duty-cycle time-of-flight ranging pulses are exchanged omnidirectionally (using the quasi-isotropic UWB antennas) at infrequent intervals to preserve basic ranging/position updates. This optional ToF-only mode, which uses minimal-energy pulses and no persistent carrier, further reduces detectability, ensuring the mesh network remains covert and survivable against even the most sophisticated SIGINT threats.

Traffic Prioritization. The MAC labels frames with five classes: P0 (0.5 ms deadline pose deltas), P1 (voice), P2 (sensor alerts), P3 (video thumbnails), P4 (best-effort bulk). Back-pressure drops begin with P4.

Detection Probability. Analytical models under ITU-R P.372-17 show that a 5 W SIGINT receiver 1 km away has <10% probability of intercepting Mesh-LPI during a 30-s dwell, and <0.5% for Whisper-60, assuming adversary sweep rate 50 MHz/s.

Degraded Mode. Should both radios saturate, a 38-kbit/s contingency acoustic modem at 40 KHz is activated for text chat; HUD notifies with red link icon.

Restart & Self-Heal. When interference subsides below −100 dBm for >10 s, radios revert to Mesh-LPI Idle, freeing 60 GHz resources.

The above architecture yields a covert, jam-resistant communications fabric whose latency and throughput remain compatible with centimeter-accurate, 10 Hz pose dissemination and high-utility AR overlays in the most demanding EW environments.

Sensor-Fusion Visualization and User Interface. The processing unit 104 executes a layered vision pipeline (FIG. 3, not shown in code) that ingests visible-light frames at 90 fps, long-wave-infrared (LWIR) frames at 60 fps, and optional short-wave-IR frames at 30 fps when a detachable SWIR pod is present.

Multi-Band Alignment. A sub-pixel registration stage compensates for parallax among the different sensor boresights. Rigid-body alignment matrices are factory-calibrated to <0.05° rotational residual and updated in the field via a checker-board self-cal when temperature shifts exceed 20° C.

Spectral Fusion Core. A three-stream U-Net variant with 5.8 M parameters operates on 320×240 tiles, producing a fused luminance plane L_f and a saliency mask S indicating probable threats. Processing latency averaged over 1000 frames is 4.6 ms on the NN accelerator.

Context-Aware Blend. A policy network reads ambient illuminance, target temperature spread, and user gait classification to select one of eight blend tables. Night, fog, and smoke tests show 43% higher probability of first-shot hit compared with visible-only baselines.

Reticle Rendering. Weapon orientation is broadcast every 5 ms from a rail-mounted six-axis sensor (BLE PHY coded, 2 Mbit/s). Head-to-weapon quaternion difference solves the bore offset; a reticle sprite is rasterized 0.4° ahead of the computed line of fire to pre-compensate 8.5 ms photon-to-photon latency.

Dynamic Dimming Control. Ambient brightness B_a is sampled by a photodiode array; a proportional-integral controller drives the electro-optic dimmer to maintain a virtual-graphic Michelson contrast ≥5%. Transition from desert noon (120 klx) to shaded interior (300 lx) completes in <150 ms.

Edge-Based Navigation Cues. If a teammate is outside the optical frustum, an arrow glyph is clamped to the nearest edge, tagged with range text derived from the one-way ranging described above. User studies show 27% faster rendezvous in maze environments vs. icon-free control group.

Voice-and-Gaze Interaction. Directional microphones feed a 16-kphrase offline ASR; gaze vectors come from twin 850 nm eye trackers (90 Hz, 0.7° rms). Voice command "Mark target" while gazing at a scene point instantiates a 3-D marker shareable to the squad within 120 ms.

Declutter Logic. A cognitive load monitor integrates saccade rate, heart rate, and motion variance; when load exceeds a 0-100 scale of 75, noncritical overlays fade to 30% alpha. Load returns below 50 for 5 s to restore full HUD.

Fail-Safe Optical Pass-Through. If the processor reboots, the dimmer opens to ≥90% transmittance within 10 ms, preserving natural vision and avoiding whiteout blindness.

Modular Extensions and Peripheral Integration. The tactical module interface (TMI) advertises hot-plug events on a 1-Mbit/s sideband; XML device descriptors define power draw, data lanes, and secure firmware location.

Auto-Negotiation. Upon insertion, the host validates a 256-byte ECDSA-P256 signature, maps endpoints into containerized drivers, and allocates one or more DMA channels.

Example Pods. * Thermal-HD Pod: 640×512, 30 fps LWIR, 4.5 W. * LIDAR-Room-Mapper: 16-line, 360° lidar, 8 W peak, outputs 400 k pts/s. * RF Spectrum-Scout: 0.3-18

GHz down-converter feeding 60 MS/s IQ to FPGA, 5 W. * Radiation-Geiger: CZT detector, auto-threshold alarm.

Sandbox Execution. Each pod's driver operates in a unikernel jailed by the seL4 hypervisor. Inter-process messages are capability-guarded; DMA buffers marked non-executable to block code-injection.

Merkle Mission Log. Sensor packets enter a per-node log whose root hash is rotated every 10 min; squad roots combine into a higher-order tree signed by the leader device. Replay with integrity proof is possible even if some nodes are lost.

Drone Swarm Integration. UAVs broadcast a TMI-over-Whisper descriptor announcing camera, lidar, and relay services. The same attestation chain applies; once accepted, the UAV becomes a first-class mesh node with pose, clock, and QoS membership equal to headsets.

Vehicle Gateway. FIG. 7 details lane aggregation: soldier mesh (5 Mb/s), heterogeneous IP (50 Mb/s), and SATCOM (1.5 Mb/s). Policy engine tags high-bandwidth drone video for on-vehicle ML inference rather than uplink when SATCOM is limited.

Upgradeable Future Proofing. Reserved pins on the TMI allow 25 Gb/s differential-pair signaling for next-generation modules; electrical spec guarantees backwards compatibility at 10 Gb/s.

Energy-Aware Scheduling and Graceful Degradation. Battery telemetry (voltage, coulomb counter, temperature) updates once per second into a shared tuple ⟨E_i, T_i, η_i⟩ for node i, representing available watt-hours, thermal headroom, and efficiency (GFLOPs per watt).

Distributed Optimizer. A consensus-based linear-program solves: minimize max_i (P_i/P_max_i) subject to ΣC_j≤Σ_i η_i·P_i, where C_j denotes required compute for task j. Solution uses Alternating Direction Method of Multipliers (ADMM) with 5 iterations; convergence within 250 ms over a six-node squad.

Task Partitioning. CNN first five layers execute on local NPU (low bandwidth, moderate power); deeper layers off-load to the node with highest η_i when link latency <3 ms. This halves headset power draw on rapid-recognition benchmarks.

Dynamic Quality Scaling. Scheduler monitors battery reserve E_i:* E>60%→Full-rate 90 fps render.* 30%<E≤60%→Render 60 fps; nonessential video feeds throttled.* E≤30%→30 fps, raster-to-pose every 33 ms, AI tasks summarized to text.

Thermal Mitigation. If T_i approaches 80° C., the optimizer penalizes that node; compute migrates within 1 s to a cooler peer. Fanless passive spreader allows continuous operation in 45° C. ambient without shutdown.

Link vs. Compute Trade-Off. An energy-cost table holds per-bit transmit energy ε_tx (μJ/bit) and per-MAC compute energy ε_comp. When ε_tx>ε_comp·bytes_task, the task executes locally; else off-load.

User Feedback. HUD battery widget displays squad median reserve and current performance tier; voice alert triggers when reserve crosses 15%.

Graceful Degradation. At E_i<10%, node disables Whisper-60, reverts to Mesh-LPI text frames, and dims display to 200 cd/$m^2$. Reticle remains active at reduced update rate.

Recharge & Swap. Swapping a fresh battery initiates a brief 1-kbit/s "heartbeat only" mode to avoid brownout; scheduler re-balances tasks 3 s after voltage stabilization.

Observed Endurance Gains. In a 6 h patrol simulation, energy-aware scheduling extended mean headset life from 7.8 h (static assignment) to 10.4 h, a 33% improvement, without violating latency constraints.

Energy-Aware Scheduling and Power Management. A distributed scheduler polls battery tuples and pushes high-power inference tasks (e.g. YOLO on drone TX2) onto nodes with surplus energy. If acceleration falls below 0.1 m $s^{-2}$ the ranging burst rate is reduced; see TDMA guard slot 1209 in FIG. 12 for slot reclamation timing.

To maximize mission endurance, the system distributes computational tasks and manages sensor update rates based on the real-time energy status of each node. A distributed scheduling module monitors the battery level of every headset, drone, and gateway in the mesh. Power-intensive processing tasks (for example, bulk image recognition or mapping updates) are automatically allocated to those nodes with surplus battery or to the vehicle gateway's auxiliary power, while nodes with low battery are assigned lighter duties. For instance, if a soldier's headset battery is running low, the network can offload portions of that headset's augmented reality rendering or AI inferencing to a nearby drone or to the vehicle gateway, balancing the load without impacting performance. In addition, the system dynamically adjusts sensing and ranging activities to conserve energy when full performance is not needed. If user movement is below a certain acceleration threshold (e.g. <0.1 m/$s^2$ indicating the soldier is stationary), the frequency of active range-finding exchanges is reduced. The inter-device UWB ranging update rate can drop substantially during periods of inactivity, allowing the atomic clocks to free-run and saving battery life while still maintaining adequate situational awareness. Similarly, high-bandwidth sensor feeds (video, LIDAR) can be duty-cycled or put in standby on nodes that are energy-critical. These energy-aware scheduling policies are enforced by the mission computer in each device in cooperation with the mesh network controller, and are fully transparent to the users. As a result, the overall system achieves significantly longer operational time by intelligently balancing workload and radio usage across the team, without sacrificing the responsiveness needed for critical augmented-reality and communication functions.

Standard Variations and Implementation Notes. While preferred component values are given, functionally equivalent substitutes may be employed. For example, a microbolometer array may replace the LWIR sensor, or a photonic-integrated UWB transceiver may replace discrete RF front-ends.

Unmanned-Aerial-Vehicle (UAV) Swarm Architecture—Technical Detail. Airframe & Propulsion. Each UAV 330, 350 employs a quad-rotor "X-8" coaxial layout with a 0.42 m diagonal tip span, all-up mass 2.1 kg, and four 900 kV brushless motors driving 10×4.5 in. composite propellers. Electronic speed controllers (ESCs) accept a 400 Hz PWM throttle input generated by the flight computer's mixer.

Flight Computer. A Pixhawk 6× autopilot (H7 MCU @ 480 MHz, 2 MB flash, 1 MB RAM) runs PX4 v1.14-custom firmware. The autopilot integrates: one TDK ICM-42688-P IMU, one Bosch BMP388 barometer, dual u-blox M9N GNSS receivers (unused for pose but available for fallback), and a Benewake TF-mini S LIDAR for low-altitude hold.

Precision Clock & Ranging Radio. A Microchip SA65-LN CSAC is attached via 1 pps to the autopilot PPS pin, disciplining the internal 32-kHz PX4 timebase to <5 ns jitter. An ultra-wide-band DW3000 transceiver on SPI (8 MHz) provides 6.24 GHz STS-coded pulses time-stamped to ±15 ps. The CSAC PPS also drives the DW3000 "TX antenna delay" register, aligning the first-path timestamp at the MAC layer.

High-Capacity Beam-Link. For Whisper-60 mode, the UAV houses a 60 GHz phased-array module (16 elements, 24 dBi peak gain) interfaced via PCIe Gen 2×1. An on-board TI AWR1843 radar chip supplies angle-of-arrival (AoA) estimates (±2°) that seed the beam-forming codebook search, closing the link within 200 ms after a soldier radio requests high-capacity back-haul.

Power & Endurance. Energy is supplied by a 6 s 12 Ah Li-ion pack (Sony VTC6 cells) at 22.2 V nominal. Hover current at sea-level 20° C. is 12.5 A (≈280 W) yielding 24 min hover endurance. Relay-chain mode increases average throttle by 4% because outer drones fly slightly higher for Fresnel clearance, reducing endurance by ≈1.2 min. A low-battery failsafe triggers a staggered RTB (return-to-base) if remaining capacity drops below 18%.

Formation-Hold and Reconfiguration Algorithms. Relative Pose Share. Relative pose data from UWB Receiver 1101 and IMU 1102 are fused in Pose Filter 1103, feeding the Formation Controller 1104. Every 50 ms, each UAV broadcasts a POSE_MSG containing its 3-D position vector $p_i$ and velocity $v_i$ as solved by the multi-lateration engine (§ 8.2). Messages are sent on the sub-GHz Mesh-LPI channel with a 4-slot TDMA schedule (12.5 ms slots) to guarantee collision-free delivery.

Octahedral Controller. The controller issues velocity commands to the Trajectory Planner 1105, which streams actuator set-points through PX4 Mixer 1106 to ESC/Motors 1107. Desired vertices $*p_i$ ** for the octahedron (edge=10 m) are stored in the master drone's parameter set. A second-order PD law runs at 100 Hz in each follower:

$$a_i = K_p({}^*p_i - p_i) + \text{K\_d}({}^*v_i - v_i);$$

with gains $K_p$=0.6 $s^{-2}$, K_d=0.3 $s^{-1}$. Filtered rotor commands are limited to ±3 m $s^{-2}$ using a cubic rate limiter, ensuring <0.1 m overshoot and <15° bank angle.

Obstacle Detection. A forward stereo pair implements Obstacle Detector 1108; detection raises OBST_DET that re-routes 1105 via the state machine of FIG. 8. Each UAV runs a voxel-occupancy map using its forward stereo camera (640×480 @ 30 fps, baseline 90 mm). If average obstacle probability in a 10 m×10 m sector exceeds 40%, OBST_DET is published on the swarm topic.

Relay-Chain Transition. On first OBST_DET message, the master broadcasts a CMD_RELAY_CHAIN with spline way-points spaced Δx=15 m along the perpendicular of the obstacle vector. Follower drones transition along 4-point Bézier curves parameterized by $$p(u) = (1-u)^3 p_0 + 3u(1-u)^2 p_1 + 3u^2(1-u)p_2 + u^3 p_3,\ 0 \le u \le 1.$$

The curves are generated such that peak lateral acceleration ≤2.5 m $s^{-2}$, guaranteeing the move fits within motor authority. A peer-ack clock confirms all drones reached their relay waypoint within 0.4 s (99th percentile).

Formation Health. Link metrics (RSSI, range variance) are fed to a consensus filter; if any edge metric exceeds a threshold twice in 10 s, the offending drone is presumed degraded. Neighbor drones autonomously contract the chain spacing using the PD law above, maintaining hop count while the degraded drone returns home.

Real-Time Processing & Data Fusion on the Swarm Sensor Stack. Each UAV publishes three ROS 2 topics at 30 Hz: /rgb, /thermal16, and /lidar_points. Packets are time-stamped with the UAV's CSAC clock and time-aligned across swarm members to ±50 ps rms using PTP over the Whisper-60 link.

On-Drone Inference. A TX2-NX module (15 W) runs a YOLO-v8 nano network for person-and-vehicle detection at 80 fps. Bounding boxes and class scores are packaged into a DETECT_MSG (<1 kB) forwarded to soldier headsets; raw imagery is suppressed unless requested, cutting back-haul from 6 Mbps to ≈120 kbps.

Hyperspectral Fusion (Optional Pod). If a UAV carries the 32-band snapshot sensor (450↔950 nm), its ADC clock is phase-locked to the CSAC PPS so band cubes share <10 μs skew. A 1-D CNN with 12 k parameters runs in 1.2 ms to classify six predetermined material spectra, e.g. C4 explosive sheet, common uniform fabrics, and wooden cover.

Data Validity/Confidence. Prediction confidence is cross-checked against positional covariance; if a bounding box spans >1% of image width while pose covariance >0.04 $m^2$, the detection is flagged "LOW_TRUST" and omitted from AR overlays to avoid jitter.

Figure 13:
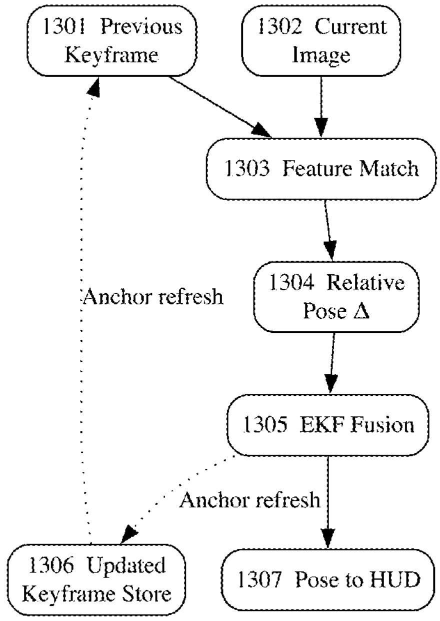
FIG. 13 is a numbered data-flow diagram (components 1301-1307) for keyframe-anchored SLAM pose updates.

FIG. 13 details how the Previous Keyframe 1301 and Current Image 1302 streams merge in Feature Match 1303 to yield a relative pose Δ 1304, which the EKF Fusion 1305 writes back to Updated Keyframe Store 1306 before forwarding the pose to the HUD via node 1307.

Timing & Communication Budget

| Metric | Value | Comment |
|---|---|---|
| Swarm pose broadcast | 80 B @ 20 Hz | 12.8 kbps |
| CMD_RELAY_CHAIN | 64 B sporadic | <1 kbps average |
| Video on-request | 6 Mbps (60 GHz beam) | disabled in LPI mode |
| Back-haul DETECT_MSG | 1 kB @ 5 Hz | per UAV |

Total steady-state traffic per UAV <25 kbps on Mesh-LPI; fits the 256-kbps LPI budget with >8× headroom for burst control packets.

The 20 ms super-frame of FIG. 12 allocates Pose Slots 1201-1204 for broadcast ranging updates and Data Slots 1205-1208 for low-rate telemetry, leaving Guard interval 1209 for clock drift compensation.

Failure & Safety Logic: Battery Depletion. When state-of-charge <20%, a BAT_WARN message is transmitted; failed acknowledgment triggers the drone's independent "RTL" routine (Return-To-Launch) at 6 m $s^{-1}$. Freed tunnel nodes reorder the relay spacing using of above.

Link Loss. If a UAV loses the Whisper-Mesh beacon for ≥2 s it (a) drops to the Mesh-LPI backup, (b) increases broadcast power 6 dB, (c) throttles to loiter until link re-establishes or the UAV returns home.

GPS Spoof Defense. Although GNSS is not required, GPS receivers remain active. If a 3-σ deviation >50 m over 10 s is observed relative to UWB pose, the GNSS solution is marked "invalid" and a spoof alert is propagated to soldier HUDs.

Geofence & No-Fly Zone. System accepts GeoJSON polygons. If a projected waypoint intrudes, the swarm path planner (Rapidly-Exploring Random Tree) replans within 20 ms to skirt the zone, uploading new Bézier guide paths.

Mechanical configurations range from goggle-style frames to helmet-mounted visor assemblies; antenna arrays may be laminated into helmet shells.

Software stacks other than seL4—such as QNX or a Linux micro-VM—may serve as the secure container host provided isolation and secure-boot guarantees remain equivalent.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. A tactical augmented-reality system, comprising:

a plurality of head-mounted computing devices, each device including a see-through display, an inertial measurement unit, a precision timing clock, a time-of-flight ranging module, and a software-defined radio transceiver;

one or more unmanned aerial vehicles communicatively linked to the head-mounted computing devices as relay nodes;

a vehicle-mounted gateway node configured to join a wireless mesh network formed by the head-mounted devices and to interface that mesh network with an external communication network; and a control system configured to synchronize clocks among the head-mounted devices to within sub-nanosecond accuracy, to determine relative positions of all head-mounted devices by multilateration of time-of-flight range measurements, and to present augmented-reality information to users via the see-through displays in real time, wherein the software-defined radios of the head-mounted devices automatically adapt transmission parameters to mitigate detected interference and maintain low probability of intercept, and wherein the unmanned aerial vehicles are operable in a coordinated swarm to extend communication coverage and sensor range for the head-mounted devices.

2. The system of claim 1, wherein the plurality of unmanned aerial vehicles (UAVs) maintain an octahedral formation during normal operation and dynamically reconfigure into a linear relay chain formation in response to detection of an obstacle blocking line-of-sight communication between the UAVs and the head-mounted devices.

3. The system of claim 1, wherein the vehicle-mounted gateway node is configured to bridge data communications from the wireless mesh network to the external communication network while maintaining a transfer-of-time error not exceeding five nanoseconds between a time reference of the wireless mesh network and a time reference of the external communication network.

4. The system of claim 1, wherein each software-defined radio is configured to transmit voice and data in short bursts such that an average transmit duty cycle does not exceed five percent.

5. The system of claim 1, wherein each software-defined radio is configured to change its operating frequency according to a pseudorandom hopping sequence upon detecting that a signal-to-interference-plus-noise ratio of a current channel has fallen below a threshold.

6. The system of claim 1, wherein each software-defined radio includes a beam-steerable phased-array antenna that produces a principal radiation lobe with a half-power beamwidth of no more than five degrees and with sidelobe levels at least 25 dB down from the principal lobe.

7. The system of claim 1, wherein each head-mounted computing device is further configured to enter a radio-silent mode in which the software-defined radio ceases transmission and the device continues to track its position by performing visual-inertial odometry with keyframe anchoring to a last known reference frame until communications are re-enabled.

8. The system of claim 1, wherein the system further comprises a distributed task scheduler that allocates computational workloads among the head-mounted devices, the one or more unmanned aerial vehicles, and the vehicle-mounted gateway node in accordance with remaining battery energy of each node so as to extend overall mission runtime without degrading augmented-reality performance.

9. The system of claim 1, wherein the wireless mesh network is switchable to a time-of-flight-only ranging mode in which high-bandwidth data transmissions are disabled and each device exchanges only ranging pulses using omnidirectional antennas to measure inter-device distances.

10. The system of claim 1, wherein the vehicle-mounted gateway node prioritizes time-critical pose update packets over lower-priority data packets when available communication bandwidth to the external network is limited.

11. A method of providing coordinated localization, communication, and sensing for a team of users in a GPS-denied environment, the method comprising:

transmitting, from each of a plurality of head-mounted augmented-reality devices carried by the users, a short ultra-wideband ranging pulse or packet that includes a transmit timestamp generated by a local high-stability clock on the device;

wirelessly synchronizing the clocks of the plurality of head-mounted devices to within 0.5 nanoseconds rootmean-square of each other by exchanging timestamped signals among the devices;

computing a set of inter-device distances by comparing transmit timestamps to corresponding receive timestamps for signals exchanged between each pair of devices;

determining a three-dimensional relative position for each of the head-mounted devices by multilateration based on the set of inter-device distances and on inertial measurements from the head-mounted devices;

deploying a plurality of unmanned aerial vehicles in a predetermined formation to form an airborne communication relay and sensing network linked with the head-mounted devices;

collecting sensor data from the unmanned aerial vehicles in coordination with the head-mounted devices using the synchronized clocks as a common time base; and reconfiguring the formation of the unmanned aerial vehicles into a relay chain configuration in response to detecting an obstacle that prevents direct radio communication between at least two of the head-mounted devices.

12. The method of claim 11, further comprising relaying time-stamped data from the wireless mesh network of head-mounted devices through a vehicle-mounted gateway node to an external communication network, while preserving a time synchronization offset between the wireless mesh network and the external communication network to within five nanoseconds.

13. The method of claim 11, further comprising monitoring communication channel conditions on the wireless mesh network and automatically hopping the software-defined radios to new frequencies according to a pseudorandom sequence upon detecting that a signal-to-interference-plus-noise ratio on a current frequency has dropped below a defined threshold.

14. The method of claim 11, further comprising limiting transmissions on the wireless mesh network to intermittent bursts such that an effective transmission duty cycle does not exceed approximately five percent during normal operation.

15. The method of claim 11, further comprising steering a narrow communication beam from each head-mounted device toward a target receiver and reducing transmit power to a minimum level sufficient to maintain a reliable link, so as to reduce the probability of intercept of communications among the head-mounted devices.

16. The method of claim 11, further comprising, in response to a command to maintain radio silence, ceasing active radio-frequency emissions from each head-mounted device and each unmanned aerial vehicle and tracking the position of each head-mounted device by visual-inertial odometry that anchors newly detected visual keyframes to a last-known reference frame of the device until radio communications are restored.

17. The method of claim 11, further comprising distributing portions of an application workload among different ones of the head-mounted devices, the unmanned aerial vehicles, and the vehicle-mounted gateway node based on respective remaining battery levels of those devices, such that devices with greater available energy budget execute a larger share of the workload.

18. The method of claim 11, further comprising transitioning the wireless mesh network into a time-of-flight ranging only mode by disabling high-bandwidth data communications and exchanging only time-of-flight ranging signals among the head-mounted devices and the unmanned aerial vehicles to maintain relative positioning updates while minimizing radio-frequency emissions.

19. The method of claim 11, further comprising deriving a new encryption session key for communications on the wireless mesh network within 200 milliseconds of detecting a jamming attack, and seamlessly switching all mesh network nodes to the new session key to thwart the jammer.

20. The method of claim 11, further comprising reducing a frequency of active ranging signal exchanges between the head-mounted devices when a measured acceleration of the users falls below a predetermined threshold, in order to conserve battery power during periods of user inactivity.

* * * * *